(12) United States Patent
Yamagata et al.

(10) Patent No.: US 9,746,058 B2
(45) Date of Patent: Aug. 29, 2017

(54) ACTUATOR FOR VEHICLES

(71) Applicant: U-SHIN LTD., Tokyo (JP)

(72) Inventors: Mikio Yamagata, Hiroshima (JP); Tetsuya Shimosawa, Hiroshima (JP)

(73) Assignee: U-SHIN LTD., Tokyo (JP)

( * ) Notice: Subject to any disclaimer, the term of this patent is extended or adjusted under 35 U.S.C. 154(b) by 375 days.

(21) Appl. No.: 14/701,984

(22) Filed: May 1, 2015

(65) Prior Publication Data

US 2015/0330483 A1    Nov. 19, 2015

(30) Foreign Application Priority Data

May 14, 2014   (JP) .................................. 2014-100644

(51) Int. Cl.
| | |
|---|---|
| *F16H 19/04* | (2006.01) |
| *E05B 81/06* | (2014.01) |
| *E05B 83/34* | (2014.01) |
| *E05B 81/18* | (2014.01) |
| *E05B 81/36* | (2014.01) |
| *E05B 81/90* | (2014.01) |

(52) U.S. Cl.
CPC ............. *F16H 19/04* (2013.01); *E05B 81/06* (2013.01); *E05B 81/18* (2013.01); *E05B 81/36* (2013.01); *E05B 81/90* (2013.01); *E05B 83/34* (2013.01); *Y10T 74/18808* (2015.01)

(58) Field of Classification Search
CPC ........... E05B 83/34; E05B 81/06; F16H 19/04
See application file for complete search history.

(56) References Cited

U.S. PATENT DOCUMENTS

| | | | | | |
|---|---|---|---|---|---|
| 2,201,670 | A | * | 5/1940 | Kraus ....................... | F16H 1/16 |
| | | | | | 74/422 |
| 2,842,976 | A | * | 7/1958 | Young ..................... | F16H 19/04 |
| | | | | | 74/425 |
| 3,174,353 | A | * | 3/1965 | Gross ...................... | F16H 1/203 |
| | | | | | 74/413 |

FOREIGN PATENT DOCUMENTS

JP         2001-65215         3/2001

* cited by examiner

*Primary Examiner* — Terence Boes
(74) *Attorney, Agent, or Firm* — Wenderoth, Lind & Ponack, L.L.P.

(57) ABSTRACT

An actuator for vehicles has a motor having an output gear, a gear member, a slide member, and an accommodation member. The gear member has a first gear part meshed with the output gear and a second gear part provided coaxial with the first gear part on a rotational plane identical to that of the first gear part and has a shape different from a shape of the first gear part. The slide member has an input gear meshed with the second gear part. The accommodation member accommodates the motor and the gear member and accommodates a part of the slide member where the input gear is provided so that the slide member is driven by the motor to be linearly moved.

8 Claims, 12 Drawing Sheets

ACTUATOR FOR VEHICLES

CROSS-REFERENCE TO RELATED APPLICATION

This application claims priority of Japanese Patent Application No. 2014-100644 filed on May 14, 2014, the content of which is incorporated herein by reference.

TECHNICAL FIELD

The present invention relates to an actuator for vehicles such as fuel lid-lock devices.

BACKGROUND

A fuel lid-lock device operates a fuel lid provided in a vehicle so as to be enabled to open and close a fuel feed opening of the vehicle. The fuel lid-lock device holds the fuel lid in is held in a locked state and further switches over between locked and unlocked state. Specifically, when a leading end of an advancing-and-retracting slide member is meshed with an engaging hole of the fuel lid, the fuel lid is held in the locked state. Further, when the leading end of the slide member is released from the engaging hole, the fuel lid is switched over from the locked state to the unlocked state.

Known mechanisms for driving the advance and retraction of the slide member includes a type employing a sector gear (a sectorial-shaped gear that performs reciprocating motion within a certain angular range) as disclosed in JP 2001-065215 A as well as other type employing a worm wheel made up of a large-diameter gear and a small-diameter gear.

The slide member protrudes outward from a casing in which a motor and other elements are accommodated. In general, the casing has a divided structure composed of a lower case and an upper case. In some cases, however, the casing is not divided into the lower case and the upper case in its part where the leading end of the slide member advances and retracts and moreover is fixed on the vehicle body side. This arrangement is intended to achieve rattling-free smooth advancing-and-retracting motions of the slide member and thereby effective prevention of water penetration into the casing. In this arrangement, the slide member runs through the lower case so as to protrude outward of the casing.

SUMMARY

Fuel lid-lock devices employing the sector gear involves the following problems.

Assembling of the worm gear-added motor and the sector gear to the lower case is followed by assembling of the slide member to them. In assembling of the slide member, there is a need for inserting the sector shaft of the sector gear into an elongated hole of the slide member while holding the leading end of the slide member inserted through the lower case. This causes a difficulty in assemblability of the slide member.

The sector shaft moves along a circular-arc shaped locus about a rotational axis of the sector gear. Since the elongated hole of the slide member needs to be sized so as to permit such circular arc-shaped movement locus of the sector shaft, width or other dimensions of the slide member need to be large-sized. As a result, a scale-up of the device is involved.

A fuel lid-lock device employing a worm gear made up of a large-diameter gear and a small-diameter gear instead of the sector gear involves the following problems.

After a worm gear-added motor and a worm wheel are assembled to a lower case and then the worm gear and the large-diameter gear of the worm wheel are meshed with each other, the slide member is assembled to them. In assembling of the slide member, there is a need for engaging the gear part (rack gear) of the slide member and the small-diameter gear of the worm wheel with each other at a correct position while allowing the leading end of the slide member to run through the lower case. This causes a difficulty in assemblability of the slide member.

Since the large-diameter gear and the small-diameter gear are placed coaxial with the rotational axis of the worm wheel, an increase of the device thickness is involved.

The above-described problems exist not only in fuel lid-lock devices but also in other vehicle-dedicated actuators having a similar structure.

An object of the present invention is to realize a scale-down of the device and an improvement of assemblability in actuators for vehicles such as fuel lid-lock devices.

The present invention provides an actuator for vehicles comprising, a motor having an output gear, a gear member having a first gear part meshed with the output gear and a second gear part provided coaxial with the first gear part on a rotational plane identical to that of the first gear part and having a shape different from a shape of the first gear part, a slide member having an input gear meshed with the second gear part, and an accommodation member accommodating the motor as well as the gear member and accommodating a part of the slide member where the input gear is provided so that the slide member is driven by the motor to be linearly moved.

A rotational output power of the motor is transmitted from the output gear to the first gear part of the gear member and then transmitted from the second gear part provided in the same gear member as the first gear part to the input gear of the slide member.

The first and second gears with different shapes are provide in the gear member. Further, the first and second gears are provided coaxial with each other on the identical rotational plane. Thus, the gear member can be reduced in thickness, resulting in reduced size of the device. Furthermore, comparing a conventional mechanism where a rotational motion of a sector gear is transformed into a linear motion of a slide member by a sector shaft and an elongated hole, a size from a rotational shaft of the gear member to the slide member can be reduced and thereby the size of the device can be reduced while necessary moving extents of the slide member are ensured.

For example, the first gear part is a helical gear and the second gear part is a spur gear.

The meshing between the output gear and the first gear part employees the helical gear, and the meshing between the second gear and the input gear part employees the spur gear. These arrangements allow the assembling process where the motor with the output gear and the slide member is assembled to the accommodation member followed by assembling of the gear member to the accommodation member. Therefore, not only assembling of the gear member to the accommodation member becomes easier, but also assembling of the slide member to the accommodation member becomes easier, thereby simplifying the assembling process as well as reduction in process number of the assembling process.

The accommodation member includes a first-half case including a motor accommodation part accommodating the motor with the output gear, a gear housing part accommodating the gear member, and a slide member accommodation part in which the slide member is arranged, the motor accommodation part, the gear housing part, and the slide member accommodation part respectively having an opening, and a second-half case to be fitted to the first-half case so as to close the opening.

Assembling can be executed by assembling the motor with the output gear, the gear member, and the slide member to the first-half case followed by fitting the second-half case to the first-half case so as to close the opening. Because the first-half case, the motor, the gear member, and the slide member are integrated into an assembly or unit, the assembling work becomes easier.

The actuator may further include a slide member run-through part provided in the first-half case so as to communicate the slide member accommodation part and exterior of the accommodation member each other and so as to allow the slide member to be inserted through the slide member run-through part, and a seal member arranged between the slide member and the slide member run-through part.

The first-half case provided with the slide member run-through part and the seal member arranged between the slide member and the slide member run-through part can effectively prevent water penetration into the accommodation member. Further, rattling of the slide member against the accommodation member can be prevented, thereby preventing occurrence of abnormal noise.

The gear member is rotatably supported by a gear shaft supported by at least one of the first-half case and the second-half case, and a rotational angle restricting mechanism for restricting a rotational angle range of the gear member about the gear shaft is provided. The rotational angle restricting mechanism may include contact parts provided in the gear member with an angular interval about the gear shaft, and a stopper which is held by the accommodation member so as to protrude between the contact parts, the stopper is to be put into contact with the contact parts by rotation of the gear member about the gear shaft so as to restrict the rotational angle range of the gear member about the gear shaft.

The actuator may further include a guide rib provided in one of the accommodation member and the slide member so as to be elongated in a moving direction of the slide member, and a guide recess provided in the other of the accommodation member and the slide member so as to elongated in the moving direction of the slide member, the guide rib being to be fitted into the guide recess.

The guide rib fitting to the guide recess guides linear motion of the slide member, achieving smooth liner motions of the slide member in a ratting-free state against the accommodation member.

The actuator may further include an elongated recess provided in one of the accommodation member and the slide member so as to extend in the moving direction of the slide member, and a restrictive protrusion provided in the other of the accommodation member and the slide member so as to extend in the moving direction of the slide member and so as to be inserted into the elongated recess.

Contacting of the restriction protrusion to the end of the elongated recess can limit a linear motion range of the slide member.

The actuator for vehicles according to the present invention includes a gear member having a first gear part to be meshed with an output gear of a motor, and a second gear part to be meshed with an input gear of a slide member, wherein the first gear part and the second gear part are integrally provided coaxial with each other on an identical rotational plane. Therefore, the gear member can be provided as a thin type one of reduced thickness and the size from the gear member to the slide member can be decreased, so that a downsizing of the device can be realized.

By adopting the meshing between the output gear and the first gear part with a helical gear as well as the meshing between the second gear part and the input gear part with a spur gear, it becomes implementable to assemble the slide member to the accommodation member before assembling the gear member thereto, so that the assemblability is improved. Furthermore, by working on the assembly basis or unit basis of the first-half case, the motor, the gear member and the slide member, the assemblability is improved.

BRIEF DESCRIPTION OF THE DRAWINGS

The foregoing and the other features of the present invention will become apparent from the following description and drawings of an illustrative embodiment of the invention in which.

DESCRIPTION OF EMBODIMENTS

Hereinbelow, an embodiment of the present invention will be described with reference to the accompanying drawings.

FIGS. 1 to 6B show a fuel lid-lock device (actuator for vehicles) 1 according to an embodiment of the invention.

(General Construction)

Figure 1:
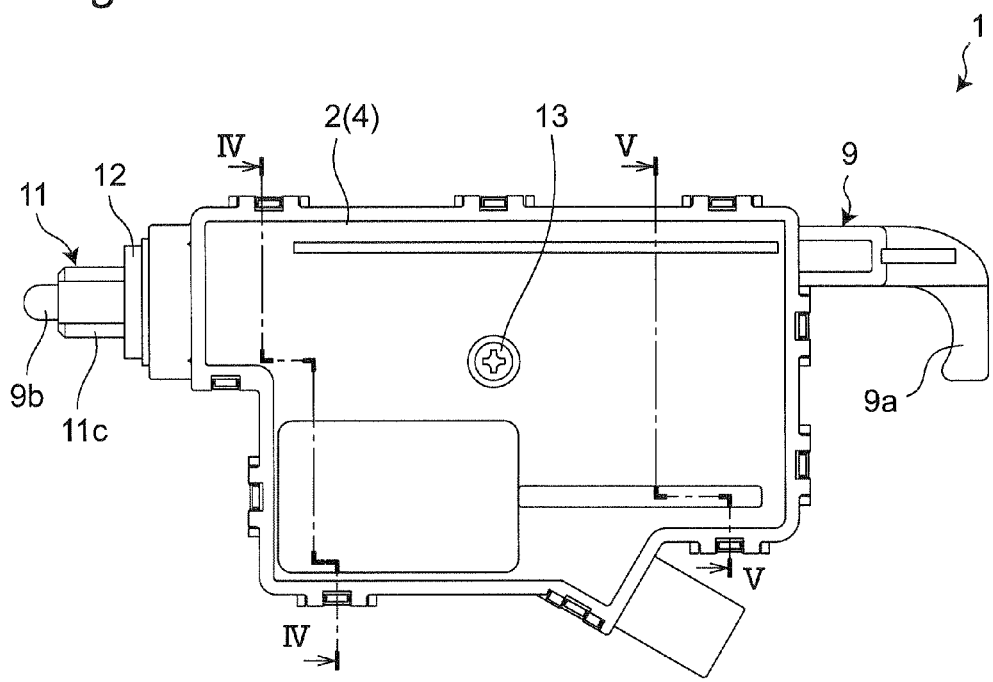
FIG. 1 is a plan view of a fuel lid-lock device according to an embodiment of the present invention.
Figure 2:
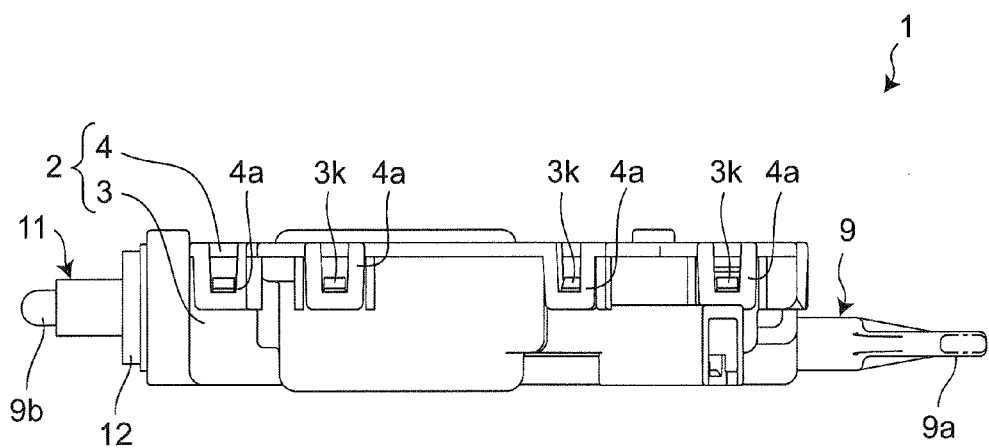
FIG. 2 is a front view of the fuel lid-lock device.

As shown most clearly in FIGS. 1 and 2, the fuel lid-lock device 1 includes a casing (accommodation member) 2 made of resin. The casing 2 is in a generally two-divided structure, including a lower case (first-half case) 3 and an upper case (second-half case) 4. The casing 2 is fixed to an unshown vehicle body.

Figure 3:
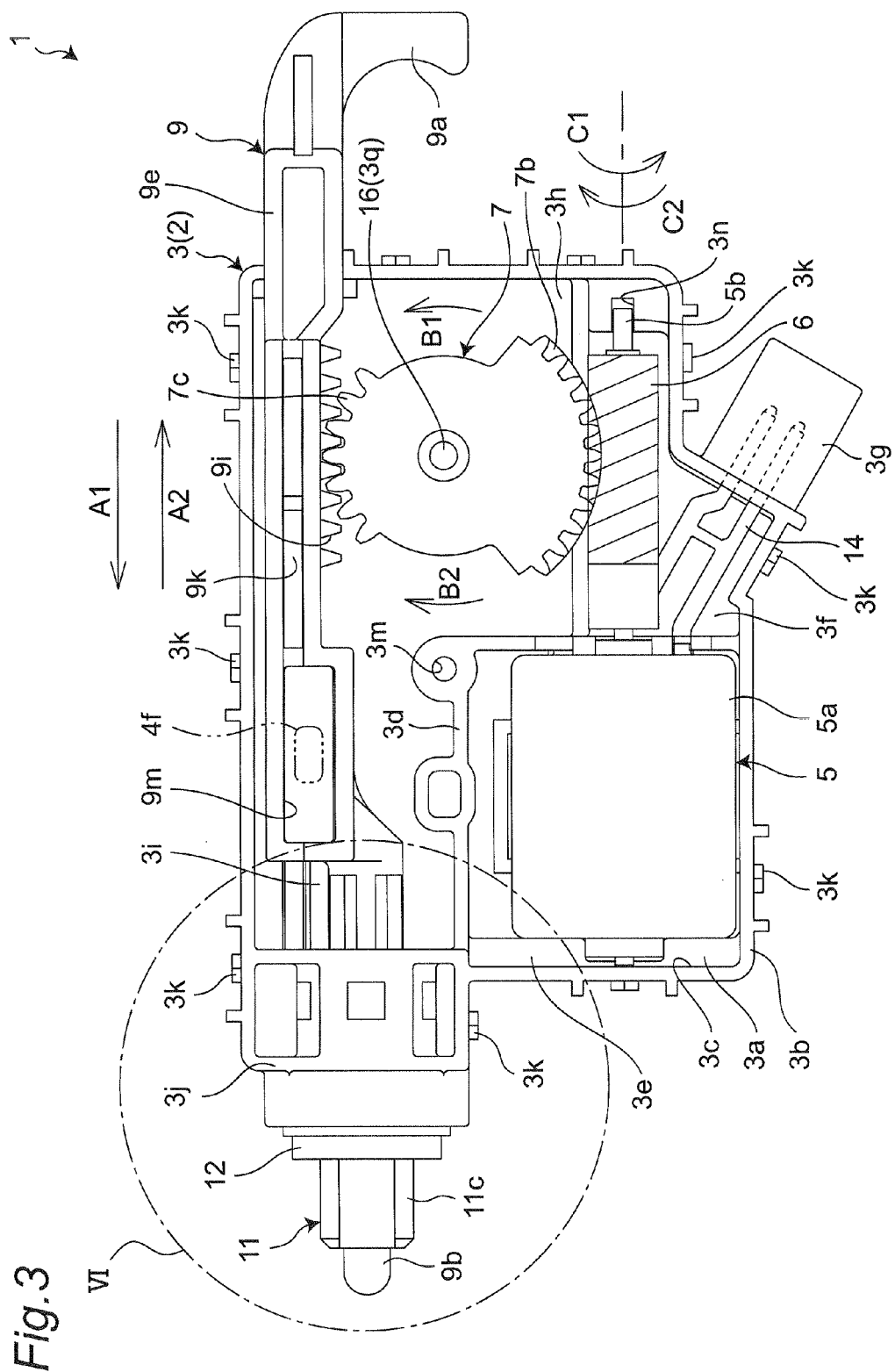
FIG. 3 is a plan view of the fuel lid-lock device with an upper case removed.
Figure 4:
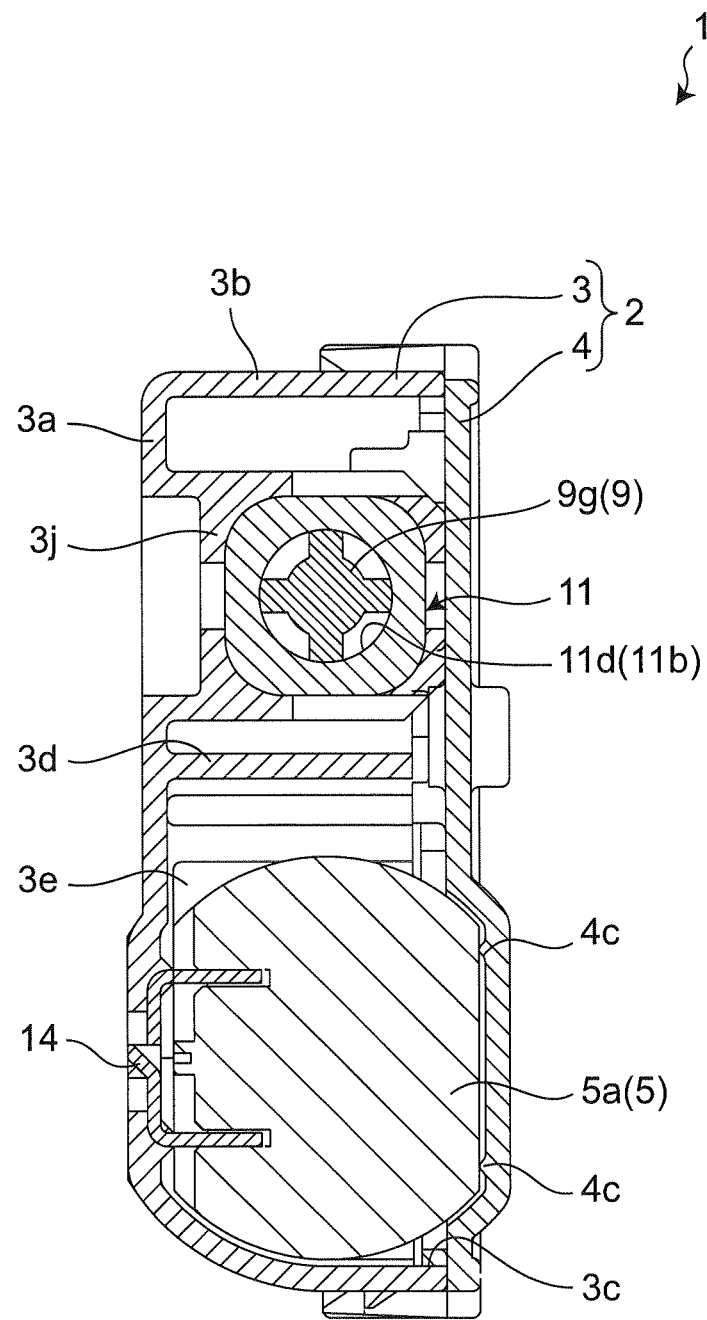
FIG. 4 is an enlarged sectional view along a line IV-IV in FIG. 1.
Figure 5:
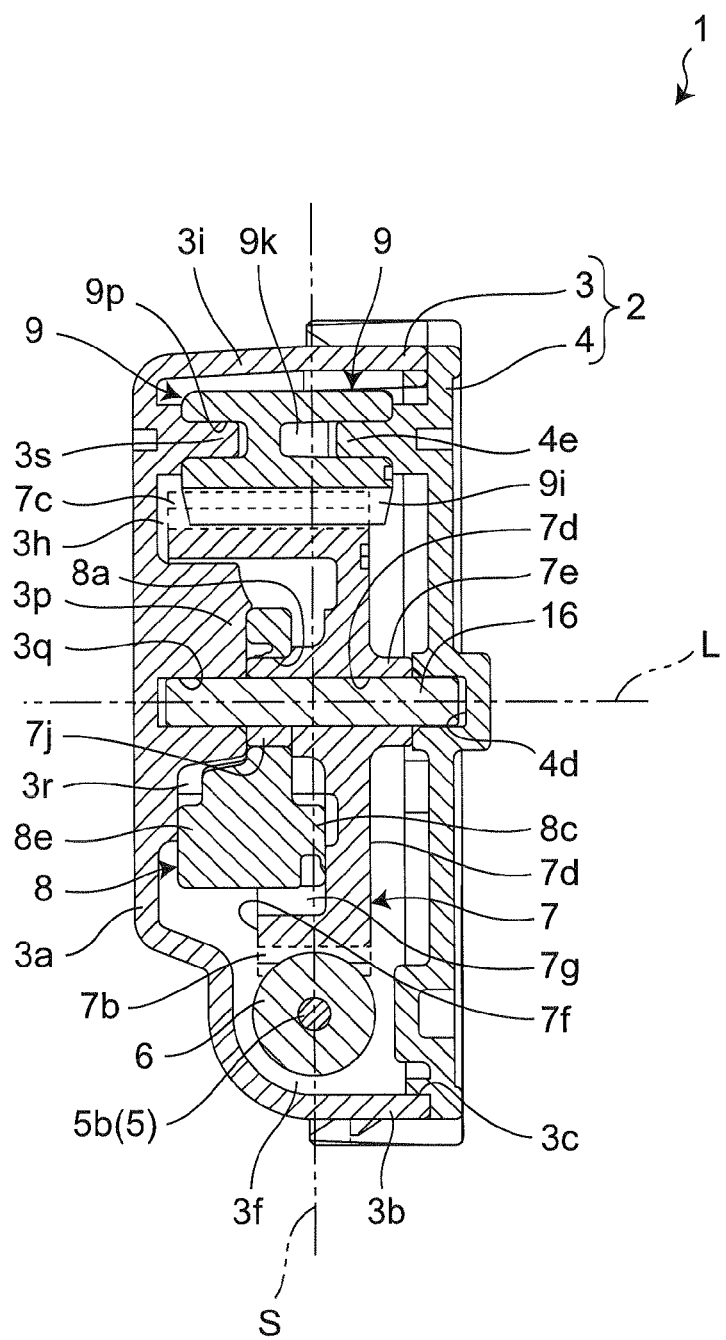
FIG. 5 is an enlarged sectional view along a line V-V in FIG. 1.

As shown in FIGS. 3 to 5 (particularly FIG. 3), a motor 5, a worm gear (output gear) 6, a gear member 7, a stopper 8 and a slide member 9 are accommodated in the casing 2.

The slide member 9 is placed so as to extend through the casing 2 and is held by the casing 2 so as to be enabled to make reciprocative linear motion (arrows A1, A2 in FIG. 3). Rotational output power of the motor 5 (see arrows C1, C2 in FIG. 3) is transmitted to the slide member 9 via the worm gear 6 and the gear member 7 (see arrows B1, B2 in FIG. 3). Therefore, the slide member 9 moves linearly in either one direction of arrows A1, A2 responsive to a rotational direction of the motor 5.

Figure 6A:
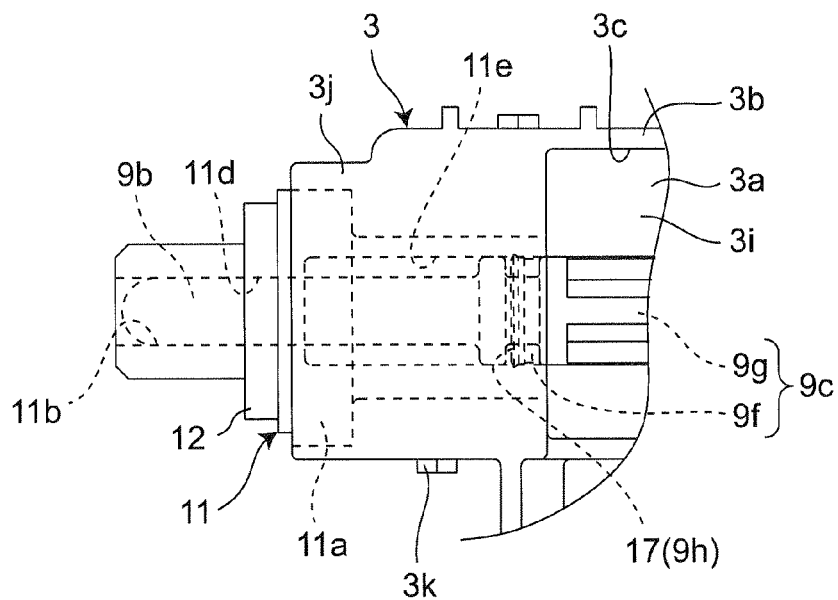
FIG. 6A is a schematic enlarged view of a portion VI in FIG. 3 (A slide member is positioned at retracted position)
Figure 6B:
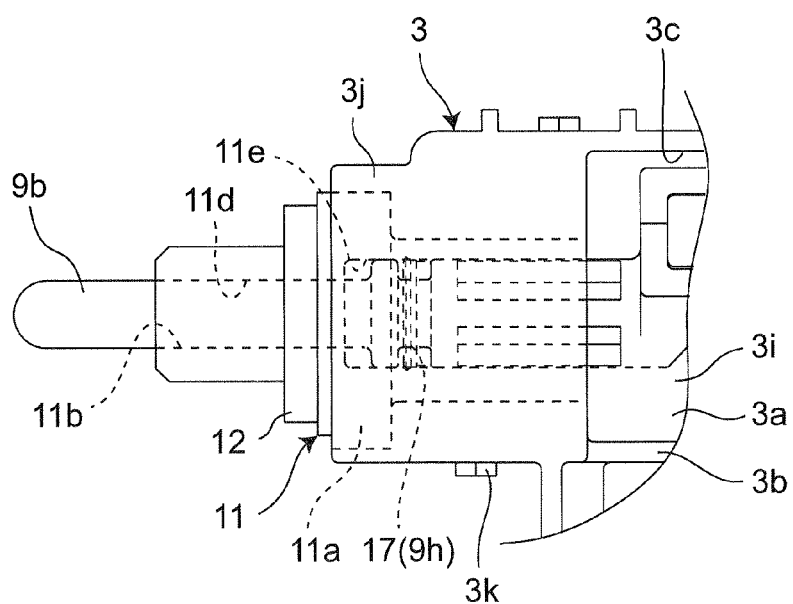
FIG. 6B is a schematic enlarged view of the portion VI in FIG. 3 (The slide member is positioned at protruded position)

Most part of the slide member 9 including a part where a later-described rack gear (input gear) 9i is formed is accommodated within the casing 2. However, a manual operation part 9a of the slide member 9 on its base end side (right side in FIG. 3), which is positioned outside the casing 2 at all times, is set in a vehicle interior (e.g. trunk room). An output part 9b of the slide member 9 on its leading end side (left side in FIG. 3) can be moved between a position of being stored within a later-described guide member 11 as shown in FIG. 6A (a lock-off position or retracted position) and a position of being outwardly protruded from the guide member 11 as shown in FIG. 6B (a lock-on position or protruded position), depending on the position of the slide member 9. In the protruded position (FIG. 6B), the output part 9b is engaged with an engaging hole of an unshown fuel lid, where the fuel lid is held in the locked state. The output part 9b, upon moving from the protruded position (FIG. 6B) to the retracted position (FIG. 6A), is released off from the engaging hole, where the fuel lid is switched over from the locked state to the unlocked state.

(Casing)

As already described, the casing 2 includes the lower case 3 and the upper case 4.

Figure 7A:
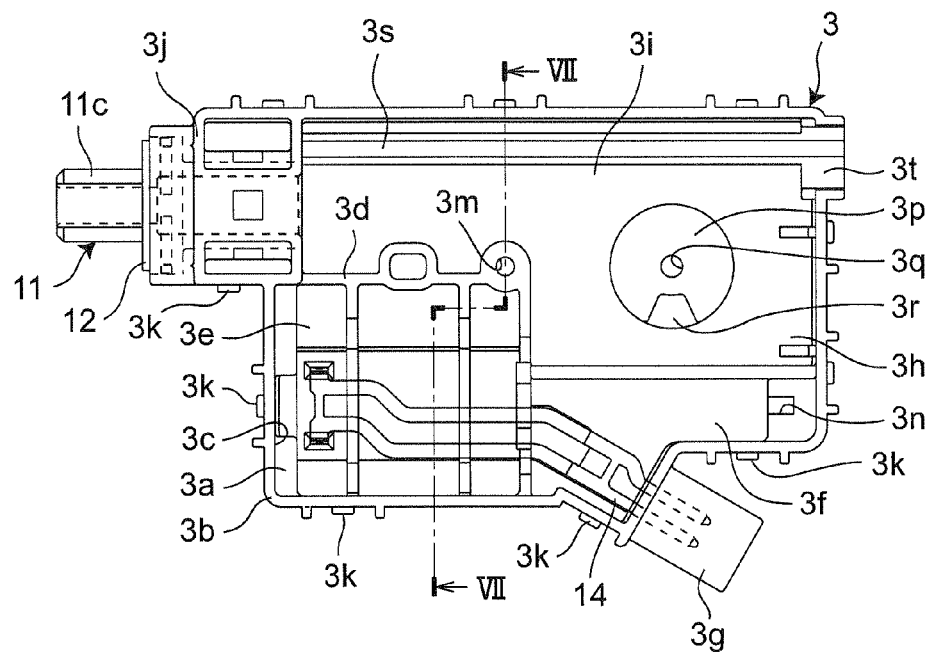
FIG. 7A is a plan view of a lower case.
Figure 7B:
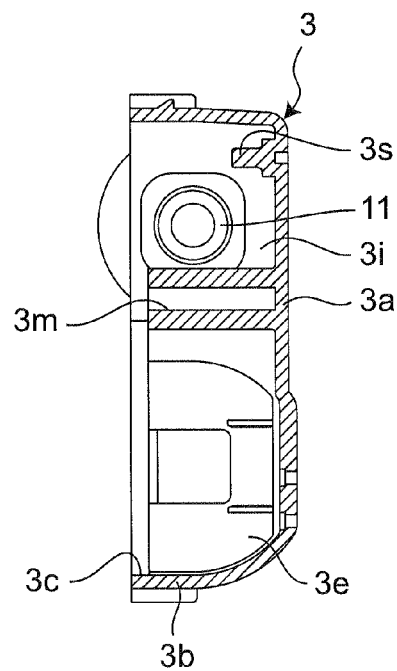
FIG. 7B is a sectional view along a line VII-VII in FIG. 7A.

FIGS. 7A and 7B show the lower case 3. The lower case 3 includes a bottom wall 3a and a peripheral wall 3b provided at a peripheral edge of the bottom wall 3a, where an area surrounded by the peripheral wall 3b forms an opening 3c. In other words, a space having the opening 3c for accommodating the motor 5 and other elements therein is formed by the bottom wall 3a and the peripheral wall 3b.

The lower case 3 includes a motor accommodation part 3e surrounded by a partition wall 3d in a lower-left corner region in FIG. 7A. A first gear accommodation part 3f is provided on the right side of the motor accommodation part 3e, as in FIG. 7A, in adjacency thereto. A connector part 3g is provided on the lower right side of the motor accommodation part 3e, as in FIG. 7A, in adjacency thereto. The lower case 3 also includes a second gear accommodation part 3h in a generally upper right region of the motor accommodation part 3e in FIG. 7A. Further, the lower case 3 includes a slide member accommodation part 3i in an upper region of the second gear accommodation part 3h in FIG. 7A.

On the left side of the slide member accommodation part 3i in FIG. 7A, a slide member run-through part 3j enough larger in wall thickness than the peripheral wall 3b is provided. Referring to FIGS. 6A and 6B in addition, the guide member 11 made from metal and opened at both ends is fixed to the slide member run-through part 3j so as to allow the output part 9b side of the slide member 9 to be inserted therethrough.

The guide member 11 is so made that a base end side portion thereof ranging from a flange-like part 11a is buried in the lower case 3 by insert molding while a leading end side portion ranging from the flange-like part 11a is protruded from the lower case 3 (slide member run-through part 3j). In the guide member 11, a guide through hole 11b is formed so as to extend through from the base-end-side end face to the leading-end-side end face. Interior of the casing 2 (slide member accommodation part 3i) and exterior of the casing 2 are communicated with each other via the guide through hole 11b. In other words, the casing 2 in one portion of the slide member 9 through which the output part 9b runs is substantially not in the two-divided structure but formed of the slide member run-through part 3j that forms part of the lower case 3. A screw part 11c (vehicle body-side fixing part) for fixation to the vehicle body is provided on the leading end side of the guide member 11. The screw part 11c is inserted, and fixedly tightened, into a fitting hole formed in an inner panel of the unshown fuel lid. Further, a pad 12 (e.g., made from rubber sponge) for cushioning between the casing 2 and the vehicle body is fitted to the slide member run-through part 3j so as to surround the screw part 11c of the guide member 11.

Figure 8A:
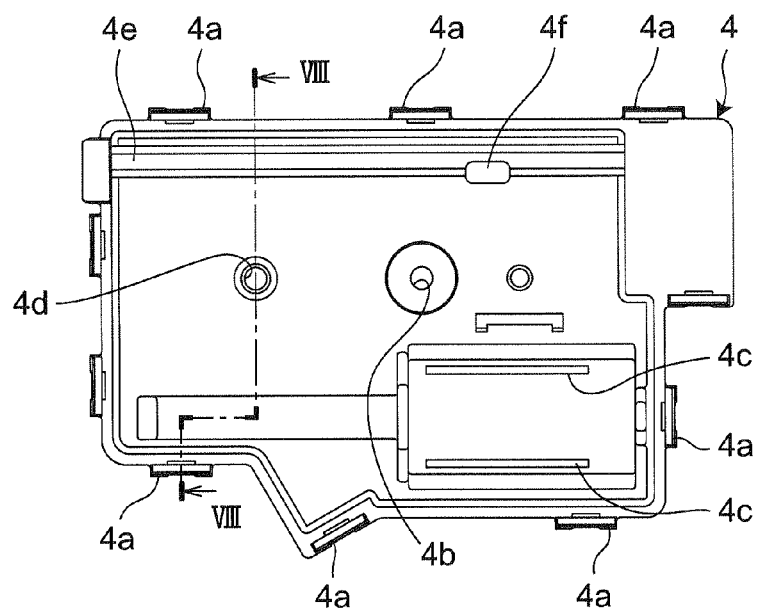
FIG. 8A is a bottom view of the upper case.
Figure 8B:
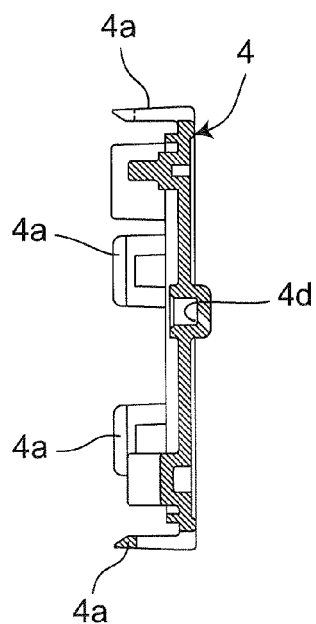
FIG. 8B is a sectional view along a line VIII-VIII in FIG. 8A.

FIGS. 8A and 8B show the upper case 4. The upper case 4 is generally plate-shaped and has a shape and dimensions which are so set that the upper case 4, when fitted to the lower case 3, can close the opening 3c of the lower case 3. Referring to FIG. 2 in combination, the upper case 4 is provided with a plurality of engaging hooks 4a. When the upper case 4 is fitted to the lower case 3, the engaging hooks 4a are engaged with engaging claws 3k of the lower case 3, by which the upper case 4 is fixed to the lower case 3 with the opening 3c closed. Further, the upper case 4 is provided with a through hole 4b. A screw 13 (see FIG. 1) inserted through the through hole 4b is screwed into a screw hole 3m (FIGS. 7A and 7A) of the lower case 3. As a result of this as well, the upper case 4 and the lower case 3 are fixed to each other.

(Motor and Worm Gear)

The motor 5 and the worm gear 6 will be described with reference to FIGS. 3 to 5 and FIGS. 7A to 8B.

Referring to FIGS. 3, 4, 7A and 7B, a body 5a of the motor 5 is accommodated in the motor accommodation part 3e of the lower case 3. By presser ribs 4c (see FIG. 8A in addition) provided on inner surfaces of the upper case 4, the body 5a is held by the motor accommodation part 3e so as to be pressed against the lower case 3. An output shaft 5b of the motor 5 protruding from the body 5a extends from the motor accommodation part 3e into the first gear accommodation part 3f. A leading end of the output shaft 5b is rotatably supported by a motor shaft supporting part 3n (see FIGS. 3 and 7A in particular), which is a recess provided in the first gear accommodation part 3f. On the bottom wall 3a of the lower case 3, as shown most clearly in FIG. 7A, a terminal 14 is placed so that its base end is positioned in the motor accommodation part 3e while its leading end is positioned in the connector part 3g. The terminal 14 is insert-molded in the lower case 3. As shown in FIG. 4, the base end of the terminal 14 is inserted into the motor 5 placed in the motor accommodation part 3e and electrically connected to a contact on the motor 5 side. The leading end of the terminal 14 is electrically connected to a terminal of a counter connector (not shown) to be fitted into the connector part 3g.

Referring to FIGS. 3 and 5, the worm gear 6 is fixedly fitted to the output shaft 5b of the motor 5. The worm gear 6 is accommodated in the first gear accommodation part 3f.

(Gear Member and Stopper)

Referring to FIGS. 3 and 5, the gear member 7 and the stopper 8 are accommodated in the second gear accommodation part 3h.

The gear member 7 will be described below.

Figure 9A:
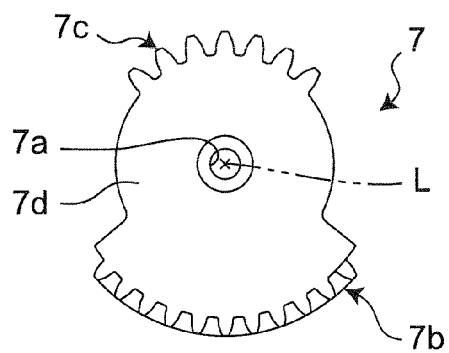
FIG. 9A is a plan view of a gear member.
Figure 9B:
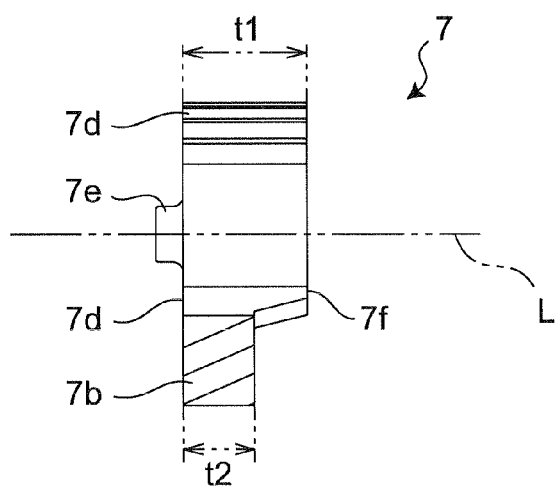
FIG. 9B is a side view of the gear member.
Figure 9C:
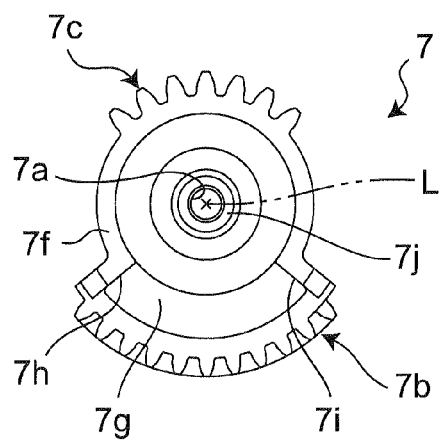
FIG. 9C is a bottom view of the gear member.
Figure 10A:
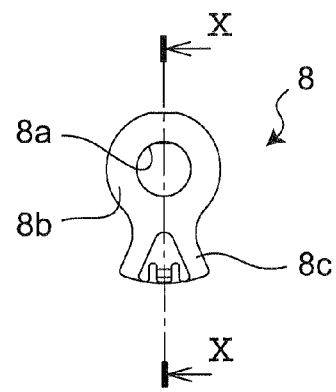
FIG. 10A is a plan view of a stopper.
Figure 10B:
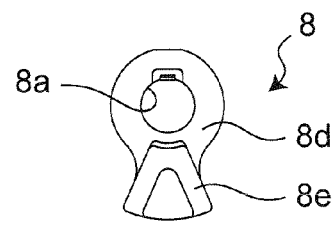
FIG. 10B is a bottom view of the stopper.
Figure 10C:
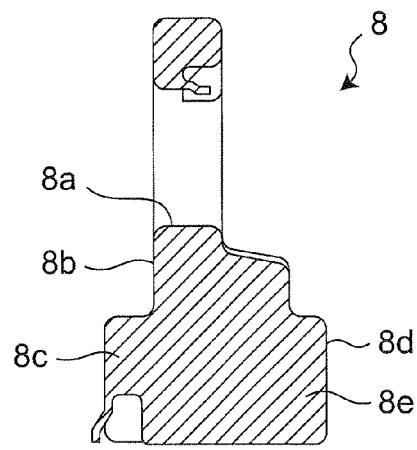
FIG. 10C is an enlarged sectional view along a ling X-X in FIG. 10A.

Referring to FIGS. 9A to 9C in combination, an insertion hole 7a for a gear shaft 16 is provided at a center of the gear member 7. An axis line L of the insertion hole 7a serves as a rotational center of the gear member 7.

In the gear member 7, a helical gear part (first gear part) 7b having a reference circle centered on the axis line L of the insertion hole 7a (serving also as the axis line of the gear shaft 16) is provided. As shown in FIGS. 3 and 5, the helical gear part 7b is meshed with the worm gear 6. The helical gear part 7b is provided not along the entire periphery of the gear member 7 but in a partial circular-arc shape centered on the axis line L.

In the gear member 7, a spur gear part (second gear part) 7c is provided on one side of the axis line L of the insertion hole 7a opposite to the side on which the helical gear part 7b is provided. As shown in FIGS. 3 and 5, the spur gear part 7c is meshed with a rack gear 9i of the later-described slide member 9. The spur gear part 7c has a reference circle centered on the axis line L. As in the case of the helical gear part 7b, the spur gear part 7c is provided in a partial circular-arc shape centered on the axis line L.

The reference circle of the helical gear part 7b and the reference circle of the spur gear part 7c are both centered on the axis line L of the insertion hole 7a. That is, the helical gear part 7b and the spur gear part 7c are provided coaxial with each other. Further, the helical gear part 7b and the spur gear part 7c are provided on one identical rotational plane conceptually indicated by sign S in FIG. 5. As indicated by signs t1, t2 in FIG. 9B, a thickness of the gear member 7 in the spur gear part 7c is larger than another thickness of the gear member 7 in the helical gear part 7b.

Referring to FIG. 5 and FIGS. 9A to 9C, a front surface 7d of the gear member 7 (its surface facing the upper case 4) is flat except a boss part 7e protruding along the axis line L. In a back surface 7f of the gear member 7 (its surface facing the lower case 3), a stopper accommodation part 7g recessed toward the front surface 7d is formed. By forming the stopper accommodation part 7g recessed like this, there are provided a pair of contact walls 7h, 7i placed with an angular interval provided therebetween about the axis line L of the insertion hole 7a. Further, a boss part 7j protruding along the axis line L is provided on the back surface 7f of the gear member 7.

The stopper 8 will be described below.

Referring to FIG. 5 and FIGS. 10A to 10C, the stopper 8 is provided with an insertion hole 8a extending therethrough in its thicknesswise direction. A contact part 8c protruding along the axis line L is provided on a front surface 8b of the stopper 8 (its surface facing the upper case 4). Further, a protrusion 8e protruding toward the lower case 3 along the axis line L is provided on a back surface 8d of the stopper 8 (its surface facing the lower case 3).

The assembly structure of the gear member 7 and the stopper 8 to the casing 2 will be described below.

Referring to FIGS. 5 and 7A, a disk-like part 3p protruding from the bottom wall 3a is provided in the second gear accommodation part 3h of the lower case 3. A gear shaft supporting hole 3q is provided at an end-face center of the disk-like part 3p. Further, a rotational angle restricting part 3r, which is a circular arc-shaped recess concentric with the gear shaft supporting hole 3q, is provided on the end face of the disk-like part 3p.

Referring to FIG. 5, with the protrusion 8e fitted into the rotational angle restricting part 3r, the stopper 8 is held to the lower case 3 while being blocked from rotating about the gear shaft 16. The gear member 7 is placed so as to be stacked on the stopper 8 with the boss part 7j inserted in the insertion hole Sa of the stopper 8.

Referring to FIGS. 8A and 8B in combination, the upper case 4 has a gear shaft supporting hole 4d provided at a position facing the gear shaft supporting hole 3q of the lower case 3 (see FIG. 7A in addition). The gear shaft 16 has one end supported by the gear shaft supporting hole 3q of the lower case 3 and the other end supported by the gear shaft supporting hole 4d of the upper case 4. The gear shaft 16 is inserted into the insertion hole 7a of the gear member 7 so that the gear member 7 is supported rotatable about the gear shaft 16.

The contact part 8c of the stopper 8 is placed within the stopper accommodation part 7g in the back surface 7f of the gear member 7. Specifically, the contact part 8c of the stopper 8 protrudes between a pair of contact walls 7h, 7i of the stopper accommodation part 7g.

(Slide Member)

Figure 11A:
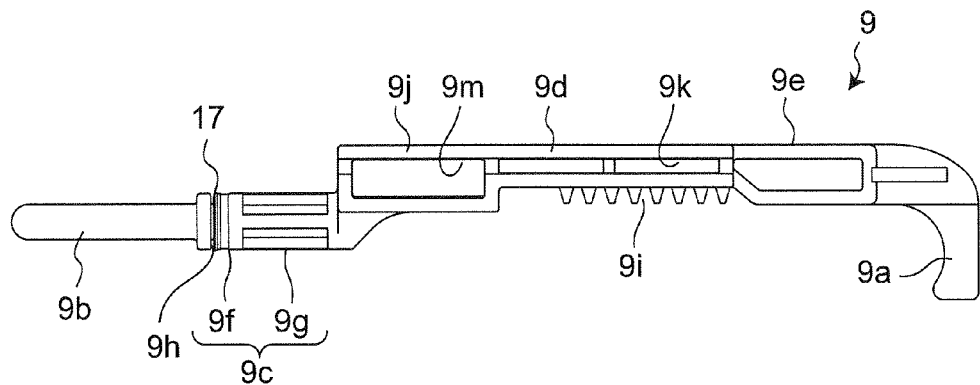
FIG. 11A is a plain view of a slide member.
Figure 11B:
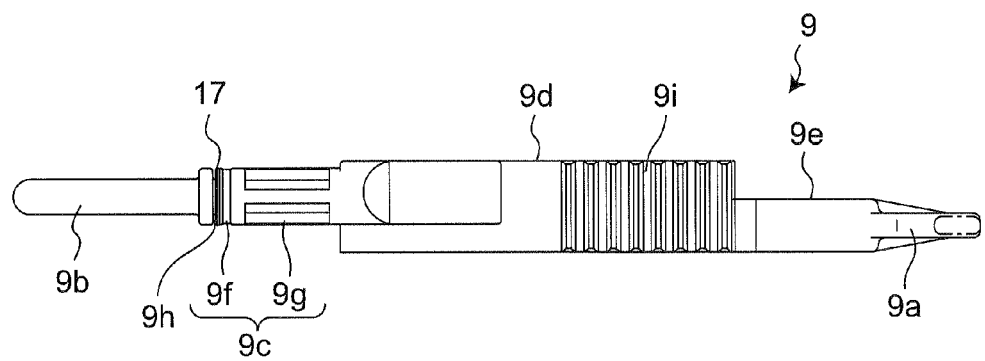
FIG. 11B is a front view of the slide member.
Figure 11C:
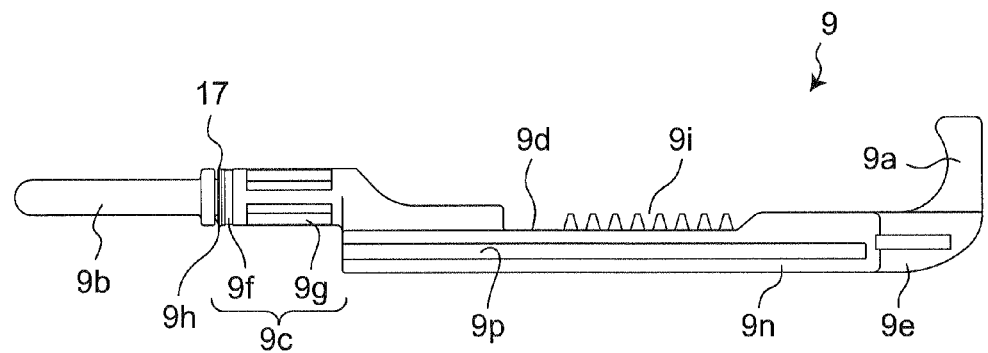
FIG. 11C is a bottom view of the slide member.

Referring to FIGS. 11A to 11C, the slide member 9 is elongate rod shaped as a whole. A manual operation part 9a having a shape suitable for operation by an operator's fingers is provided on the most base end side of the slide member 9. An output part 9b which is circular-in-cross-section rod shaped with a hemispherical-shaped leading end is provided on the most leading end side of the slide member 9. The slide member 9 is provided with a plunger-like part 9c, an intermediate part 9d, and a run-through part 9e as listed in order from the output part 9b toward the manual operation part 9a.

The plunger-like part 9c of the slide member 9 is provided with a short-columnar-shaped body 9f. The output part 9b protrudes from this body 9f. The plunger-like part 9c is provided with a rod part 9g that couples the body 9f and the intermediate part 9d to each other.

Referring to FIGS. 6A and 6B in combination, an annular groove 9h is formed in the short-columnar-shaped body 9f of the plunger-like part 9c. A generally annular-shaped seal member 17 having a lip is fitted to the annular groove 9h. The seal member 17 is made from an elastic material such as rubber. Referring to FIG. 4 in addition, the rod part 9g of the plunger-like part 9c has a cruciform cross-sectional shape. That is, the rod part 9g has ribs which are placed at equiangular intervals in the peripheral direction and which extend in the longitudinal direction.

As shown in FIG. 11B, a rack gear (input gear) 9i is provided in a side surface of the intermediate part 9d of the slide member 9 (its side surface facing the gear member 7). Referring to FIGS. 3 and 5 in addition, the rack gear 9i is meshed with the spur gear part 7c of the gear member 7.

As shown in FIG. 11A, a guide recess 9k that is a linear-shaped recess and an elongated recess 9m that is larger in recess width than the guide recess 9k are provided in a front surface 9j in the intermediate part 9d of the slide member 9 (i.e. its surface facing the upper case 4 when the slide member 9 is accommodated in the casing 2). As shown in FIG. 11C, a guide recess 9p which is a linear-shaped recess, is provided also in a back surface 9n of the slide member 9 (its surface facing the lower case 3 when the slide member 9 is accommodated in the casing 2).

As shown most clearly in FIGS. 1 to 3, when the run-through part 9e runs through the casing 2, the slide member 9 is protruded outside, with the result that the manual operation part 9a is placed outside the casing 2.

The assembly structure of the slide member 9 to the casing 2 will be described below.

Referring to FIG. 3 and FIGS. 6A and 6B, the output part 9b of the slide member 9 and the body 9f out of the plunger-like part 9c of the slide member 9 are inserted into the guide through hole 11b of the guide member 11 (fixed to the lower case 3 as described before). The guide through hole 11b includes a leading end-side small-diameter portion 11d and a base end-side large-diameter portion 11e. The output part 9b is inserted into the small-diameter portion 11d while the body 9f is inserted into the large-diameter portion 11e. The seal member 17 fitted to the body 9f is in close contact with the hole wall of the large-diameter portion 11e of the guide through hole 11b. In other words, the seal member 17 is placed between the slide member 9 (body 9f of the plunger-like part 9c) and the slide member run-through part 3j (guide member 11 fixed to the slide member run-through part 3j).

Referring to FIGS. 7A and 7B, in the slide member accommodation part 3i on the inner surface of the lower case 3, a guide rib 3s which is a linear-shaped rib extending in the moving direction of the slide member 9 (see arrows A1, A2 in FIG. 1) is provided. Referring to FIGS. 8A and 8B, also on the inner surface of the upper case 4, a guide rib 4e which is a linear-shaped rib extending in the moving direction of the slide member 9 is provided. As shown in FIG. 5, the guide rib 3s of the lower case 3 is fitted into the guide recess 9p of the slide member 9 while the guide rib 4e of the upper case 4 is fitted into the guide recess 9k of the slide member 9. By these guide recesses 9p, 9k and the guide ribs 3s, 4e, the slide member 9 is held so as to be permitted to make only linear motion in directions of arrows A1, A2 of FIG. 3 relative to the casing 2.

Referring to FIG. 7A, in the peripheral wall 3b of the lower case 3, a cutout 3t is provided at a right end portion of the guide rib 3s as in the figure. As shown most clearly in FIG. 3, the run-through part 9e of the slide member 9 runs through the cutout 3t so as to protrude from inside to outside of the lower case 3, thus the base end side of the slide member 9 running through the casing 2.

Referring to FIG. 8A, a restrictive protrusion 4f protruding from the inner surface of the upper case 4 is provided. As conceptually shown in FIG. 3, the restrictive protrusion 4f is inserted into the elongated recess 9m of the slide member 9.

(Operation)

Operation of the fuel lid-lock device 1 according to this embodiment will be described below.

Referring to FIG. 3, as the motor 5 is activated by power feed via the terminal 14, the output shaft 5b as well as the worm gear 6 are rotated (see arrows C1, C2). Rotation of the worm gear 6 is transmitted to the gear member 7 by the meshing between the worm gear 6 and the helical gear part 7b of the gear member 7, being transformed into rotation of the gear member 7 about the gear shaft 16 (see arrows B1, B2). The rotation of the gear member 7 about the gear shaft 16 is transmitted to the slide member 9 by the meshing between the spur gear part 7c of the gear member 7 and the rack gear 9i of the slide member 9, being transformed into linear motion of the slide member 9 (see arrows A1, A2).

Referring to FIGS. 3, 5 and 7A, as the contact walls 7h, 7i of the gear member 7 come into contact with the contact part 8c of the stopper 8, the angular range of rotation of the gear member 7 about the gear shaft 16 is restricted, by which the range of linear motion of the slide member 9 is restricted. In this embodiment, the stopper 8, whose material is elastomer, absorbs shocks upon contact of the contact walls 7h, 7i with the contact part 8c of the stopper 8. Further, although the stopper 8 is provided independent of the gear member 7 so as to improve the durability and the operating noise in this embodiment, yet the stopper may be provided in a structure integrated with the gear member 7 or the lower case 3.

As shown most clearly in FIG. 5, the linear-shaped, enough-lengthened guide recesses 9p, 9k and the similarly linear-shaped, enough-lengthened guide ribs 3s, 4e are fitted to each other, linear motion of the slide member 9 is guided (arrows A1, A2 in FIG. 3). Therefore, the slide member 9 is enabled to make smooth linear motions in a rattling-free state against the casing 2.

Referring to FIGS. 6A and 6B, whichever the output part 9b is positioned in the retracted position (FIG. 6A) or in the protruded position (FIG. 6B) by linear motion of the slide member 9, the seal member 17 is in close contact with the hole wall of the large-diameter portion 11e of the guide through hole 11b provided in the guide member 11. As a result of this, water penetration into the casing 2 via the guide through hole 11b can be effectively prevented. Further, by the seal member 17 coming into close contact with the hole wall of the guide through hole 11b, the output part 9b of the slide member 9 can be prevented from rattling against the guide member 11. As a consequence, rattling of the slide member 9 against the casing 2 can be prevented, so that occurrence of abnormal noise due to interference between the slide member 9 and the casing 2 can be prevented.

For example, upon a loss of power or fault of the drive circuit for the motor 5 or the like, the fuel lid can be unlocked by manually pulling the manual operation part 9a of the slide member 9 from within the vehicle interior so that the output part 9b of the slide member 9 is linearly moved from the lock-on position or protruded position shown in FIG. 6B to the lock-off position or retracted position shown in FIG. 6A. The range of the linear motion of the slide member 9 during the operation of the manual operation part 9a is limited by contact of the restrictive protrusion 4f with an end portion of the elongated recess 9m.

The fuel lid-lock device 1 of this embodiment can be downsized particularly in terms of the following points.

First, the helical gear part 7b and the spur gear part 7c are formed integrally in the single gear member 7. Further, the helical gear part 7b and the spur gear part 7c are provided coaxial with each other on one identical rotational plane. Thus, the gear member 7 can be reduced in thickness.

Figure 12:
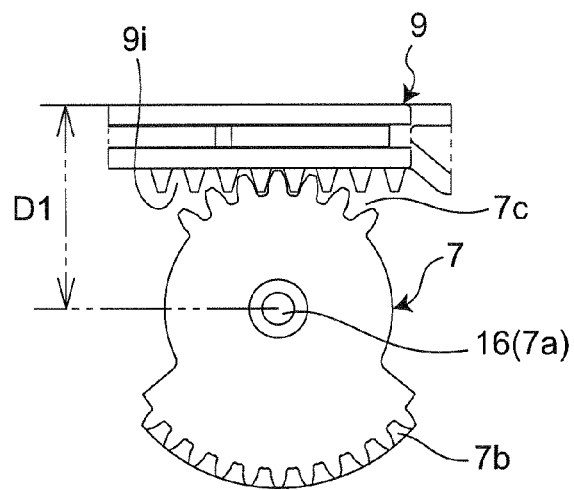
FIG. 12 is a partial plan view of the fuel lid-lock device according to the embodiment of the present invention.
Figure 13:
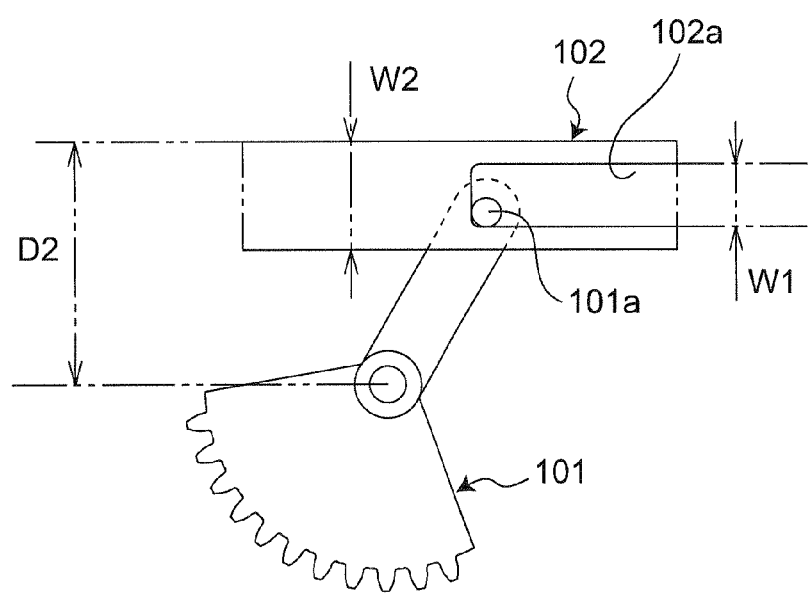
FIG. 13 is a schematic partial plain view of a conventional fuel lid-lock device with a sector gear.

Next, transmission of the driving force of the gear member 7 to the slide member 9 is based on the meshing between the spur gear part 7c of the gear member 7 and the rack gear 9i of the slide member 9. Therefore, a distance or size D1 from the gear shaft 16 to the slide member 9 conceptually shown in FIG. 12 can be made smaller than a distance or size D2 in conventional mechanisms (conceptually shown in FIG. 13) in which rotational motion of a sector gear 101 is transformed into a linear motion of a slide member 102 by a sector shaft 101a and an elongated hole 102a. The sector shaft 101a moves while drawing a circular-arc shaped locus about a gear shaft 103 of the sector gear 101. Further, since a width W1 of the elongated hole 102a of the slide member 102 needs to be sized so large as to permit such a circular arc-shaped locus of the sector shaft 101a, a width W2 of the slide member 102 is also increased. For these reasons, the structure of FIG. 13 involves an increased distance or size D2. In this embodiment, on the other hand, since rotational motion of the gear member 7 is transformed into linear motion of the slide member 9 by the meshing between the spur gear part 7c and the rack gear 9i, the distance or size D1 from the gear shaft 16 to the slide member 9 can be decreased while necessary moving extents of the slide member 9 are ensured.

(Assembling Work)

The assembling work of the fuel lid-lock device 1 according to this embodiment will be described below.

First, the motor 5 (with the worm gear 6 already fitted to the output shaft 5b) and the slide member 9 are assembled to the lower case 3 that is in a state shown in FIG. 7A. Since the opening 3c is provided in the lower case 3, interior of the lower case 3 is easily accessible.

The body 5a of the motor 5 is accommodated in the motor accommodation part 3e, and the output shaft 5b and the worm gear 6 are accommodated in the first gear accommodation part 3f.

Figure 14:
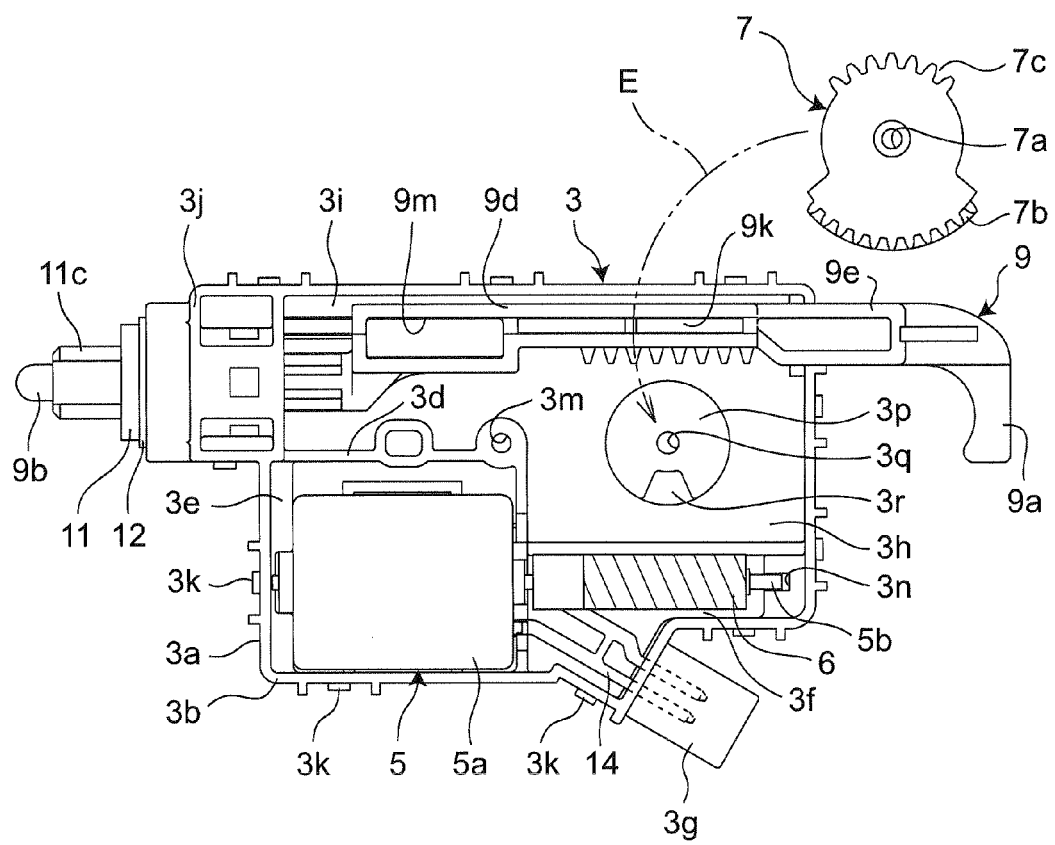
FIG. 14 is a front view of the fuel lid-lock device with the upper case removed (before assembling of the gear member).

The output part 9b and the plunger-like part 9c of the slide member 9 are inserted into the guide through hole 11b of the guide member 11. Further, the slide member 9 is accommodated in the slide member accommodation part 3i of the lower case 3 so that the guide rib 3s of the lower case 3 is fitted into the guide recess 9p (see FIG. 11C) of the slide member 9 and the run-through part 9e of the slide member 9 is placed at the cutout 3t of the lower case 3. A state in which assembling of the motor 5 and the slide member 9 to the lower case 3 has been completed is shown in FIG. 14. At the step of assembling the slide member 9 to the lower case 3 as shown above, the gear member 7 has not yet been fitted to the lower case 3. Accordingly, there is no need for taking into consideration the meshing between the rack gear 9i of the slide member 9 and the spur gear part 7c of the gear member 7, so that the slide member 9 can be assembled to the lower case 3 by taking into consideration only the insertion of the slide member 9 into the guide through hole and the fitting of the guide rib 3s into the guide recess 9p. From this point of view, the fuel lid-lock device 1 of this embodiment is excellent in assemblability.

Next, as conceptually shown by arrow E in FIG. 14, the stopper 8 (not shown in FIG. 14) and the gear member 7 are assembled to the lower case 3. The helical gear part 7b of the gear member 7 and the worm gear 6 are meshed with each other, and the spur gear part 7c of the gear member 7 and the rack gear 9i of the slide member 9 are meshed with each other. Therefore, merely by inserting the gear shaft 16 (whose one end is supported by the gear shaft supporting hole 3q of the lower case 3) into the insertion hole 7a of the gear member 7, the gear member 7 can easily be assembled to the lower case 3.

As described above, the meshing between the motor 5 side and the gear member 7 employees the helical gear, and the meshing between the gear member 7 and the slide member 9 employees the spur gear. These arrangements allow the assembling process where the motor 5 and the slide member 9 is assembled to the lower case 3 followed by assembling of the gear member 7. Therefore, not only assembling of the gear member 7 to the lower case 3 becomes easier, but also assembling of the slide member 9 to the lower case 3 becomes easier, thereby simplifying the assembling process as well as reduction in process number of assembling process.

FIG. 3 shows the state in which assembling of the motor 5 (with the worm gear 6 already fitted to the output shaft 5b), the slide member 9, the gear member 7, and the stopper 8 to the lower case 3 has been completed. As shown in FIG. 3, the lower case 3, the motor 5, the slide member 9, the gear member 7, and the stopper 8 (not shown in FIG. 3) are integrated into an assembly or unit. The upper case 4 is fitted to the lower case 3 so as to close the opening 3c of the lower case 3 as an assembly or unit to which the motor 5, the slide member 9, the gear member 7, and the stopper 8 have been assembled. The upper case 4 is fixed to the lower case 3 by engagement between the engaging hooks 4a and the engaging claws 3k (see FIG. 2) and by the screw 13 (see FIG. 1). By working on the assembly basis made up of the lower case 3, the motor 5, the slide member 9, the gear member 7 and the stopper 8 as described above, the assembling work becomes easier.

The present invention is not limited to the above-described embodiment and may be modified in various ways as exemplified below.

The gear shaft 16 may be supported by only one of the lower case 3 and the upper case 4.

It is also allowable that a member corresponding to the guide recess 9p is provided in the lower case 3 while a member corresponding to the guide rib 3s is provided in the slide member 9. Similarly, it is also allowable that a member corresponding to the guide recess 9k is provided in the upper case 4 while a member corresponding to the guide rib 4e is provided in the slide member 9.

It is also allowable that a member corresponding to the restrictive protrusion 41 is provided in the slide member 9 while a member corresponding to the elongated recess 9m is provided in the lower case 3 or the upper case 4.

Although the present invention has been described on a fuel lid-lock device taken as an example, yet the invention may also be applied to actuators for vehicles other than fuel lid-lock devices.

What is claimed is:

1. An actuator for vehicles, comprising:
 a motor having an output gear;
 a gear member having a first gear part meshed with the output gear and a second gear part provided coaxial with the first gear part on a rotational plane identical to that of the first gear part and having a shape different from a shape of the first gear part;
 a slide member having an input gear meshed with the second gear part; and
 an accommodation member accommodating the motor as well as the gear member and accommodating a part of the slide member where the input gear is provided so that the slide member is driven by the motor to be linearly moved.

2. The actuator for vehicles according to claim 1, wherein the first gear part is a helical gear and the second gear part is a spur gear.

3. The actuator for vehicles according to claim 2, wherein the accommodation member comprises:
 a first-half case including a motor accommodation part accommodating the motor with the output gear, a gear housing part accommodating the gear member, and a slide member accommodation part in which the slide member is arranged, the motor accommodation part, the gear housing part, and the slide member accommodation part respectively having an opening; and
 a second-half case to be fitted to the first-half case so as to close the opening.

4. The actuator for vehicles according to claim 3, further comprising:

a slide member run-through part provided in the first-half case so as to communicate the slide member accommodation part and exterior of the accommodation member each other and so as to allow the slide member to be inserted through the slide member run-through part; and a seal member arranged between the slide member and the slide member run-through part.

5. The actuator for vehicles according to claim 4, wherein the gear member is rotatably supported by a gear shaft supported by at least one of the first-half case and the second-half case, and wherein a rotational angle restricting mechanism for restricting a rotational angle range of the gear member about the gear shaft is provided.

6. The actuator for vehicles according to claim 5, wherein the rotational angle restricting mechanism comprises:

contact parts provided in the gear member with an angular interval about the gear shaft; and a stopper which is held by the accommodation member so as to protrude between the contact parts, the stopper is to be put into contact with the contact parts by rotation of the gear member about the gear shaft so as to restrict the rotational angle range of the gear member about the gear shaft.

7. The actuator for vehicles according to claim 1, further comprising:

a guide rib provided in one of the accommodation member and the slide member so as to be elongated in a moving direction of the slide member; and a guide recess provided in the other of the accommodation member and the slide member so as to elongate in the moving direction of the slide member, the guide rib being to be fitted into the guide recess.

8. The actuator for vehicles according to claim 1, further comprising:

an elongated recess provided in one of the accommodation member and the slide member so as to extend in the moving direction of the slide member; and a restrictive protrusion provided in the other of the accommodation member and the slide member so as to extend in the moving direction of the slide member and so as to be inserted into the elongated recess.

* * * * *